United States Patent
Terada

(10) Patent No.: US 12,017,549 B2
(45) Date of Patent: Jun. 25, 2024

(54) POWER TRANSMISSION DEVICE AND METHOD OF CONTROLLING POWER TRANSMISSION DEVICE

(71) Applicant: NISSAN MOTOR CO., LTD., Yokohama (JP)

(72) Inventor: Kota Terada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 771 days.

(21) Appl. No.: 17/057,795

(22) PCT Filed: May 28, 2018

(86) PCT No.: PCT/JP2018/020367
§ 371 (c)(1),
(2) Date: Nov. 23, 2020

(87) PCT Pub. No.: WO2019/229808
PCT Pub. Date: Dec. 5, 2019

(65) Prior Publication Data
US 2021/0197677 A1    Jul. 1, 2021

(51) Int. Cl.
*B60L 53/124* (2019.01)
*B60L 53/38* (2019.01)
*H02J 50/12* (2016.01)
*H02J 50/90* (2016.01)

(52) U.S. Cl.
CPC ............. *B60L 53/124* (2019.02); *B60L 53/38* (2019.02); *H02J 50/12* (2016.02); *H02J 50/90* (2016.02)

(58) Field of Classification Search
CPC .............................. B60L 53/124; H02J 50/12
USPC ........................................................ 320/108
See application file for complete search history.

(56) References Cited

U.S. PATENT DOCUMENTS

| 9,550,427 B2 | 1/2017 | Takeshita et al. | |
| 2015/0355359 A1* | 12/2015 | Miyashita | H02J 50/60 324/207.16 |
| 2015/0355360 A1* | 12/2015 | Miyashita | G01V 3/10 320/108 |
| 2018/0001772 A1* | 1/2018 | Jang | B60L 58/18 |
| 2019/0241087 A1* | 8/2019 | Islinger | B60L 53/305 |
| 2020/0235593 A1* | 7/2020 | Jang | H02J 50/80 |

FOREIGN PATENT DOCUMENTS

JP        2016-103645        6/2016

* cited by examiner

*Primary Examiner* — Eric D Lee
(74) *Attorney, Agent, or Firm* — Foley & Lardner LLP

(57) ABSTRACT

A power transmission device includes a power transmission coil configured to supply electric power via a wireless connection to a power reception coil mounted on a vehicle, a cover covering at least the top surface of the power transmission coil in an axial direction, a foreign-matter detection coil provided between the power transmission coil and the cover, and an elevating mechanism configured to move the power transmission coil and the foreign-matter detection coil up and down with respect to the ground while keeping a gap between the power transmission coil and the foreign-matter detection coil. The foreign-matter detection coil is separated from the cover with a predetermined distance in the axial direction before detecting foreign matter.

4 Claims, 14 Drawing Sheets

STANDBY STATE

FOREIGN-MATTER DETECTING STATE

CHARGING STATE

STANDBY STATE

FOREIGN-MATTER DETECTING STATE

CHARGING STATE

STANDBY STATE

FOREIGN-MATTER DETECTING STATE

CHARGING STATE

STANDBY STATE

FOREIGN-MATTER DETECTING STATE

CHARGING STATE

STANDBY STATE

FOREIGN-MATTER DETECTING STATE
AND CHARGING STATE

STANDBY STATE

FOREIGN-MATTER DETECTING STATE
AND CHARGING STATE

POWER TRANSMISSION DEVICE AND METHOD OF CONTROLLING POWER TRANSMISSION DEVICE

TECHNICAL FIELD

The present invention relates to a power transmission device and a method of controlling a power transmission device.

BACKGROUND ART

Techniques are known that supply electricity in a wireless manner from a power transmission coil located on the ground to a power reception coil mounted on a vehicle (Patent Literature 1). Patent Literature 1 discloses a device having an air layer between a power transmission coil and a cover covering the power transmission coil so as to reduce Joule heat transmitted to the cover.

CITATION LIST

Patent Literature

Patent Literature 1: Japanese Unexamined Patent Application Publication No. 2016-103645

SUMMARY OF INVENTION

A foreign-matter detection coil is sometimes arranged on the upper side of the power transmission coil in an axial direction. If the air layer disclosed in Patent Literature 1 is employed and arranged between the foreign-matter detection coil and the cover, a distance between the foreign-matter detection coil and the cover increases. The increase in the distance may decrease the accuracy of detecting foreign matter.

In view of the foregoing problem, the present invention provides a power transmission device and a method of controlling a power transmission device contributing to reducing heat transfer between a power transmission coil and a cover, and improving an accuracy of detecting foreign matter.

A power transmission device according to an aspect of the present invention includes a power transmission coil configured to supply electric power via a wireless connection to a power reception coil mounted on a vehicle, a cover covering at least a top surface of the power transmission coil in an axial direction, a foreign-matter detection coil provided between the power transmission coil and the cover, and an elevating mechanism configured to move the power transmission coil and the foreign-matter detection coil up and down with respect to the ground while keeping a gap between the power transmission coil and the foreign-matter detection coil. The elevating mechanism moves up the foreign-matter detection coil so as to lead a distance between the foreign-matter detection coil and the cover to be shorter than a predetermined distance when the foreign-matter detection coil detects foreign matter.

ADVANTAGEOUS EFFECTS

The present invention can reduce heat transfer between the power transmission coil and the cover, and improve the accuracy of detecting foreign matter.

DESCRIPTION OF EMBODIMENTS

Figure 1:
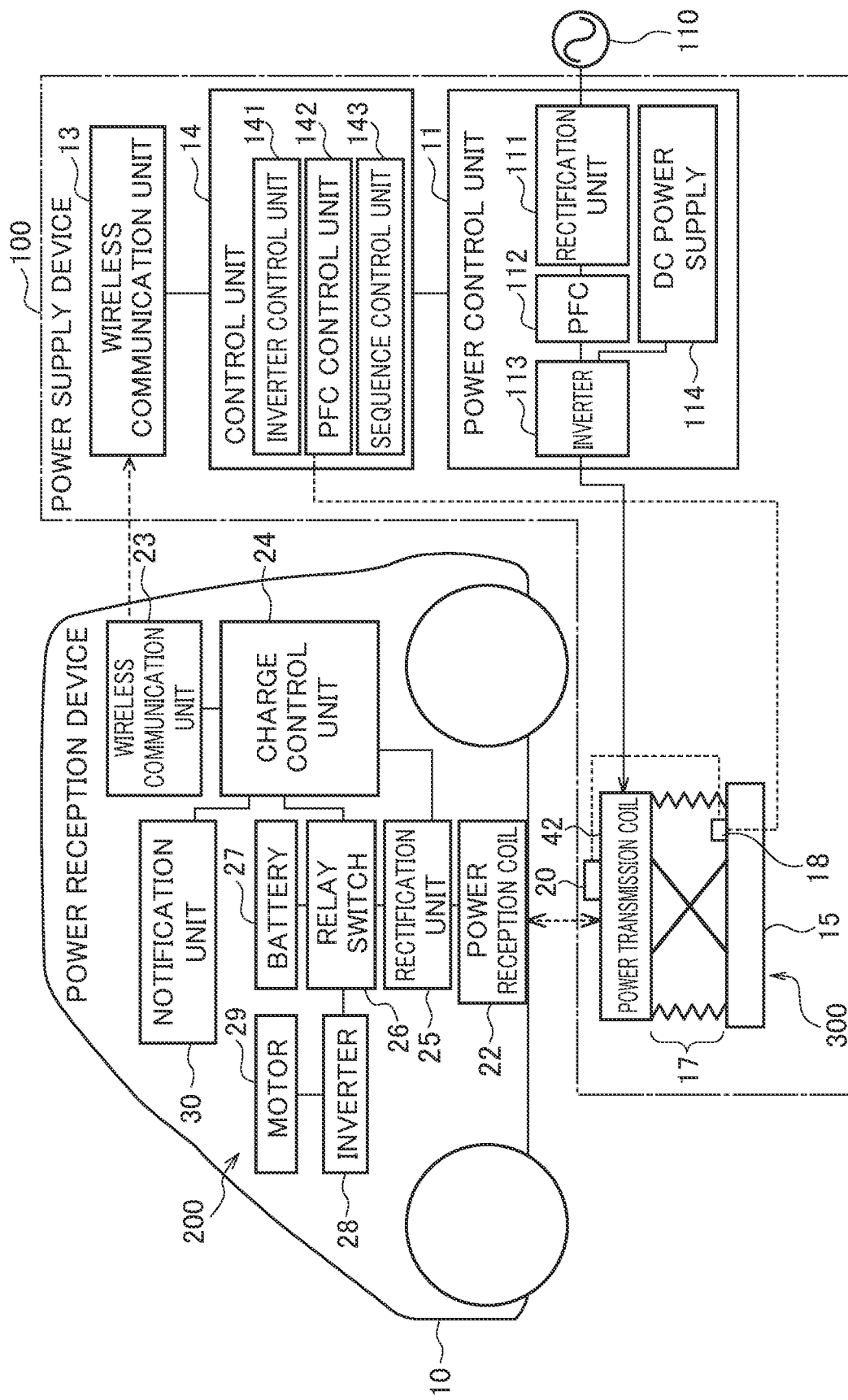
FIG. 1 is a schematic configuration diagram illustrating a wireless power supply system according to an embodiment of the present invention.

An embodiment of the present invention will be described below with reference to the drawings. The same elements described with reference to the respective drawings are denoted by the same reference numerals, and overlapping explanations are not made below.

(Configuration of Wireless Power Supply System)

A configuration of a wireless power supply system is described below with reference to FIG. 1 and FIG. 2. As illustrated in FIG. 1, the wireless power supply system includes a power supply device 100 which is a ground-side unit, and a power reception device 200 which is a vehicle-side unit. The wireless power supply system is configured to supply electric power via a wireless connection from the power supply device 100 placed in a power supply station, for example, to the power reception device 200 mounted on a vehicle 10 such as an electric vehicle and a hybrid vehicle so as to charge a battery 27 mounted on the vehicle 10.

The power supply device 100 includes a power transmission device 300 placed in a parking space located adjacent to the power supply station. The power transmission device 300 includes a power transmission coil 42, a ground-fixed part 15, an elevating mechanism 17, a drive control unit 18, and a distance sensor 20. The power reception device 200 includes a power reception coil 22 mounted on the bottom of the vehicle 10. The power reception coil 22 is arranged so as to be opposed to the power transmission coil 42 when the vehicle 10 is parked at a predetermined position (a power-supply available position) in the parking space. The power reception coil 22 may be installed in a swingable manner via a swinging structure under the floor of the vehicle 10. The power transmission device 300 and the power reception device 200 may include a resonance capacitor.

The power transmission coil 42, which is a primary coil of a litz wire, transmits electric power to the power reception coil 22. The power reception coil 22, which is a secondary coil of a litz wire, receives the electric power from the power transmission coil 42. The electromagnetic induction between the respective coils enables the power supply from the power transmission coil 42 to the power reception coil 22 in a wireless manner. The power supply in the wireless manner is not limited to a means of the electromagnetic induction, and may be a means of magnetic resonance, for example.

The ground-fixed part 15 is a device fixed on the ground. The power transmission coil 42 is moved up and down with respect to the ground-fixed part 15, namely, comes up and down with respect to the ground.

The drive control unit 18 receives a signal from a control unit 14 to control an actuator 44 (refer to FIG. 3A to FIG. 3C) in accordance with the signal received. The drive control unit 18 and the actuator 44 are described in detail below.

The elevating mechanism 17 uses the power of the actuator 44 to move the power transmission coil 42 up and down in the vertical direction or stop the power transmission coil 42.

The distance sensor 20 measures a distance between the power transmission coil 42 and the power reception coil 22. The distance sensor 20 sends the measured distance to the control unit 14. The control unit 14 controls the drive control unit 18 in accordance with the distance acquired from the distance sensor 20. The power reception coil 22 may be moved in the vertical direction in the same manner as the power transmission coil 42.

The power supply device 100 includes a power control unit 11, a wireless communication unit 13, and the control unit 14.

The power control unit 11 is a circuit which converts AC power transmitted from an AC power supply 110 to AC power with a high frequency so as to transmit the converted power to the power transmission coil 42. The power control unit 11 includes a rectification unit 111, a power factor correction (PFC) circuit 112, a DC power supply 114, and an inverter 113.

The rectification unit 111 is a circuit electrically connected to the AC power supply 110 to rectify the AC power output from the AC power supply 110. The PFC circuit 112 is a circuit for correcting a power factor by rectifying a waveform output from the rectification unit 111, and is connected between the rectification unit 111 and the inverter 113.

The inverter 113 includes a PWM control circuit including a switching element such as an IGBT, and converts DC power to AC power in accordance with a switching control signal so as to supply the converted power to the power transmission coil 42. The DC power supply 114 outputs DC voltage when the power transmission coil 42 is subjected to minute excitation.

The wireless communication unit 13 communicates with a wireless communication unit 23 provided in the vehicle 10 through Wi-Fi communication.

The control unit 14 is a controller for controlling the entire power supply device 100, and includes an inverter control unit 141, a PFC control unit 142, and a sequence control unit 143. The control unit 14 executes the processing of determining a parking position when the vehicle 10 is parked in the parking space. The PFC control unit 142 generates an excitation power instruction, and at the same time, the inverter control unit 141 generates a frequency instruction and duty of the excitation power, for example, so as to control the inverter 113. The control unit 14 thus transmits the electric power for determining the parking position from the power transmission coil 42 to the power reception coil 22. The control unit 14, when executing the processing of determining the parking position, subjects the power transmission coil 42 to minute excitation or weak excitation so as to transmit the electric power for the parking position determination. The sequence control unit 143 communicates with the power reception device 200 to send/receive sequence information via the wireless communication unit 13. The minute excitation and the weak excitation both are excitation weaker than that during normal charging, and as weak as a level having no influence on the circumference. The control unit 14 and the drive control unit 18 are each a general-purpose microcomputer including a central processing unit (CPU), a memory, and an input/output unit, for example.

The power reception device 200 includes the power reception coil 22, the wireless communication unit 23, a charge control unit 24, a rectification unit 25, a relay switch 26, the battery 27, an inverter 28, a motor 29, and a notification unit 30.

The wireless communication unit 23 communicates with the wireless communication unit 13 provided in the power supply device 100.

The charge control unit 24 is a controller for controlling the charge of the battery 27. The charge control unit 24 executes the processing of determining the parking position when the vehicle 10 is parked in the parking space. The charge control unit 24 then monitors the electric power received by the power reception coil 22. The charge control unit 24 detects a position of the power reception coil 22 in accordance with the voltage received by the power reception coil 22 when the power transmission coil 42 is excited. The charge control unit 24 also controls the wireless communication unit 23, the notification unit 30, the relay switch 26, and the like, and sends a signal indicating the start of charging to the control unit 14 of the power supply device 100 via the wireless communication unit 23.

Figure 2:
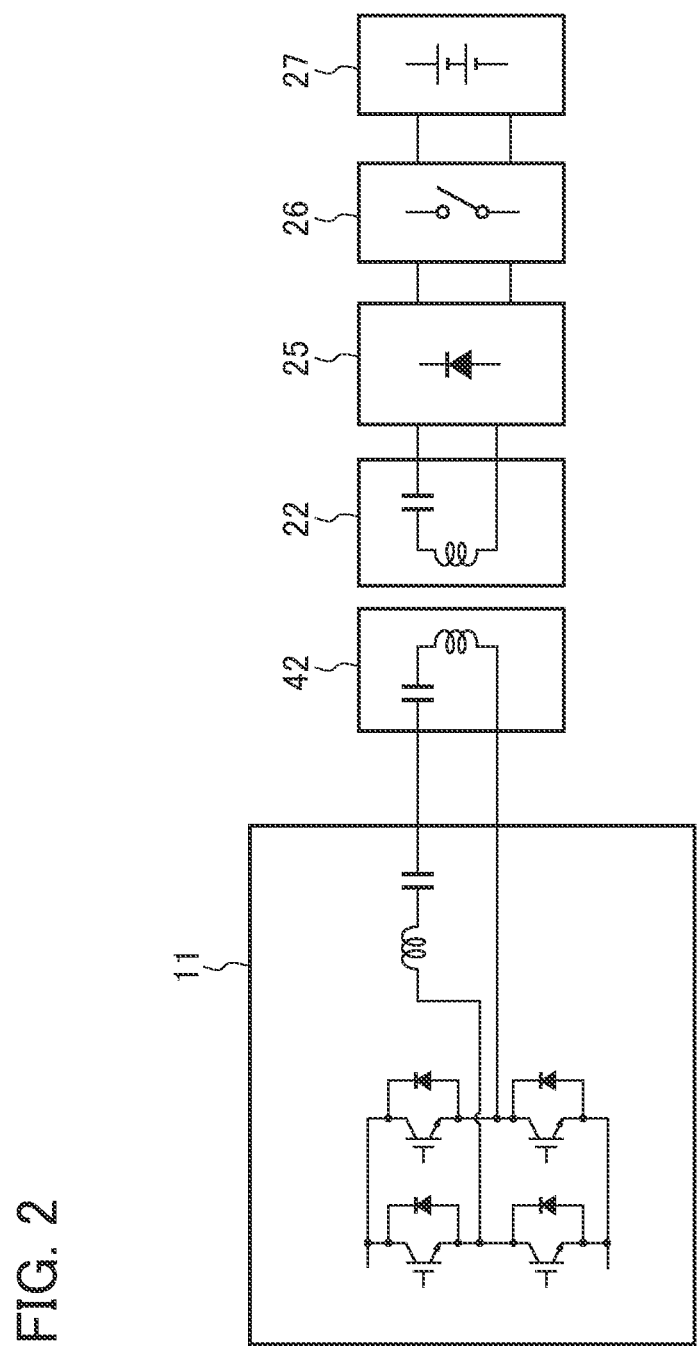
FIG. 2 is a schematic circuit diagram of a wireless power supply according to the embodiment of the present invention.

The rectification unit 25 is connected to the power reception coil 22, and rectifies the AC power received by the power reception coil 22 to DC power so as to output the electric power to the battery 27 or the inverter 28 (refer to FIG. 2).

The relay switch 26 is switched between the ON state and the OFF state through the control by the charge control unit 24. When the relay switch 26 is in the OFF state, the battery 27 and the rectification unit 25 are electrically isolated from each other (refer to FIG. 2). The battery 27 includes a plurality of secondary batteries connected together so as to serve as a power source of the vehicle 10.

The inverter 28 includes a PWM control circuit including a switching element such as an IGBT, and converts the DC power output from the battery 27 to AC power in accordance with a switching control signal to supply the converted power to the motor 29.

The motor 29 is a three-phase AC motor, for example, and serves as a drive source for driving the vehicle 10.

The notification unit 30 is a warning lamp, or a display or a speaker of a navigation device, for example, and outputs and presents light, an image, or voice to the user in accordance with the control by the charge control unit 24.

The specific configuration of the power transmission device 300, and the upward and downward movements of the power transmission coil 42 are described below with reference to FIG. 3A to FIG. 3C.

Figure 3A:
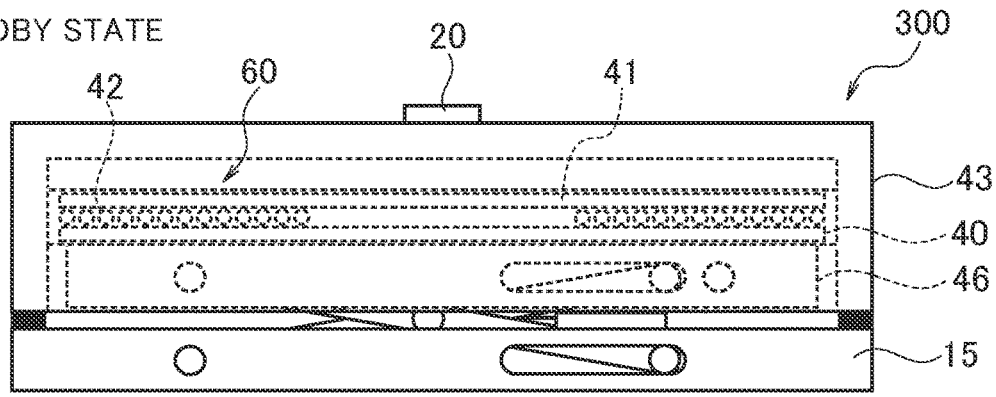
FIG. 3A is a diagram for explaining a standby state according to the embodiment of the present invention.

As illustrated in FIG. 3A, a foreign-matter detection coil 41 is provided on the upper side of the power transmission coil 42 in the axial direction. The foreign-matter detection coil 41 is a coil for detecting a change in magnetic flux density on the surface of the power transmission device 300 (the surface of a cover 43) to detect foreign matter (for example, metallic foreign matter). The axial direction of the power transmission coil 42 as used in the present embodiment is the vertical direction (the upper-lower direction). The magnetic flux density as used herein is magnetic flux density generated when the power transmission coil 42 is subjected to weak excitation.

As illustrated in FIG. 3A, a ferrite core 40 is provided on the lower side of the power transmission coil 42 in the axial direction. A coil-fixed part 46 is provided on the lower side of the ferrite core 40. Although not illustrated, a nonmagnetic metal plate may be arranged between the ferrite core 40 and the coil-fixed part 46. The power transmission coil 42 and the foreign-matter detection coil 41 are fixed to the coil-fixed part 46. The elevating mechanism 17 moves the coil-fixed part 46 up and down so as to cause the power transmission coil 42 and the foreign-matter detection coil 41 to come up and down with respect to the ground, while keeping a gap (a distance) between the power transmission coil 42 and the foreign-matter detection coil 41. Namely, the power transmission coil 42 and the foreign-matter detection coil 41 are simultaneously moved up and down in association with the movement of the coil-fixed part 46.

The elevating mechanism 17 is arranged under the power transmission coil 42 in the axial direction. As illustrated in FIG. 3C, the elevating mechanism 17 includes two arms 45, the actuator 44, the drive control unit 18, and bellows 50.

The bellows 50 are formed from rubber, resin, or metal, for example. The bellows 50 prevent water or foreign matter from entering between the ground-fixed part 15 and the cover 43. The drive control unit 18 receives the signal from the control unit 14 so as to control the actuator 44 in accordance with the signal received. The operation of the actuator 44 drives the arms 45. The operation of the arms 45 causes the power transmission coil 42 and the foreign-matter detection coil 41 to come up and down while keeping the gap between the power transmission coil 42 and the foreign-matter detection coil 41. The actuator 44 may be an electric motor, a hydraulic actuator, or a pneumatic actuator.

The cover 43 covers at least the top surface of the power transmission coil 42 in the axial direction. FIG. 3A illustrates a case in which the cover 43 covers the side surface and the top surface in the axial direction of the power transmission coil 42. The cover 43 also covers the side surface and the top surface of the foreign-matter detection coil 41. The cover 43 is formed from thermoplastic resin such as polypropylene.

In a standby state illustrated in FIG. 3A, the power transmission coil 42 is moved down to be close to the ground by the elevating mechanism 17. In the standby state, an air layer 60 is provided between the power transmission coil 42 and the cover 43 in the axial direction, more particularly, between the foreign-matter detection coil 41 and the cover 43 in the axial direction. The term "standby state" as used in the present embodiment refers to a state before charging and before detecting foreign matter.

The air layer 60 provided between the power transmission coil 42 and the cover 43 in the axial direction in the standby state illustrated in FIG. 3A, can avoid or reduce the transmission of heat of the cover 43 toward the power transmission coil 42 if the temperature of the cover 43 increases due to irradiation with sunlight. If the air layer 60 is not provided between the power transmission coil 42 and the cover 43 in the axial direction, in other words, if the power transmission coil 42 and the cover 43 are close to each other in the axial direction, the heat of the cover 43 is easily transmitted to the power transmission coil 42. The temperature of the power transmission coil 42 typically increases during charging. The charge stops when the temperature of the power transmission coil 42 exceeds a temperature required for protecting other components. The temperature of the power transmission coil 42 increases before charging when the power transmission coil 42 and the cover 43 are close to each other in the axial direction. This case increases the probability that the charge stops, since the temperature of the power transmission coil 42 further increases during charging. According to the present embodiment, the air layer 60 is provided between the power transmission coil 42 and the cover 43 in the axial direction in the standby state illustrated in FIG. 3A, which is the state before detecting foreign matter. In particular, the air layer 60 is provided between the foreign-matter detection coil 41 and the cover 43. The air layer 60 can reduce the transmission of heat of the cover 43 toward the power transmission coil 42 if the temperature of the cover 43 increases due to the irradiation with sunlight. The probability that the charge stops is thus reduced.

Regarding the wireless power supply, the detection of foreign matter is made before charging. The detection of foreign matter uses weak excitation weaker than that during charging. The reason for this is that the cover 43 can be deformed due to heat generation of metallic foreign matter if the power transmission coil 42 is subjected to excitation with the same level as that during charging when the metallic foreign matter is present on the top surface of the cover 43. Since the weak excitation is used upon the foreign matter detection, the accuracy when the foreign-matter detection coil 41 detects foreign matter increases as the distance between the foreign-matter detection coil 41 and the foreign matter is shorter. Namely, the accuracy of detecting foreign matter increases as the distance between the foreign-matter detection coil 41 and the cover 43 is shorter. FIG. 3A illustrates the standby state in which the foreign-matter detection coil 41 is separated from the cover 43 with a predetermined distance in the axial direction. In a foreign-matter detecting state illustrated in FIG. 3B, the elevating mechanism 17 moves up the coil-fixed part 46 so as to minimize the distance between the coil-fixed part 46 and the cover 43. Namely, the elevating mechanism 17 moves up the foreign-matter detection coil 41 when detecting foreign matter, so as to lead the distance between the foreign-matter detection coil 41 and the cover 43 to be shorter than the predetermined distance shown in FIG. 3A. The upward movement thus minimizes the distance between the foreign-matter detection coil 41 and the cover 43, improving the accuracy of detecting foreign matter accordingly.

The elevating mechanism 17 moves up the power transmission coil 42 and the foreign-matter detection coil 41 together while keeping the gap between the power transmission coil 42 and the foreign-matter detection coil 41, as described above. The reason for keeping the gap between the power transmission coil 42 and the foreign-matter detection coil 41 is as follows. The foreign-matter detection coil 41 detects a change in magnetic field density on the surface of the cover 43 to detect foreign matter, as described above. A method of detecting a change in magnetic field density on the surface of the cover 43 is a comparison with predetermined magnetic field density, for example. The detection method as an example is to preliminarily set magnetic field density generated when the power transmission coil 42 is subjected to weak excitation in the case of the absence of foreign matter, and compare the magnetic field density when detecting foreign matter with the magnetic field density preliminarily set. The foreign matter is determined to be present when the foreign-matter detection coil 41 detects a change in the magnetic field density. The magnetic field density preliminarily set is detected in a state in which the gap between the power transmission coil 42 and the foreign-matter detection coil 41 is set to a predetermined constant value. If the gap between the power transmission coil 42 and the foreign-matter detection coil 41 varies, the magnetic field density detected by the foreign-matter detection coil 41 may change regardless of the presence or absence of foreign matter, which hinders the accurate detection of foreign matter. According to the present embodiment, the elevating mechanism 17 moves up the power transmission coil 42 and the foreign-matter detection coil 41 while keeping the gap between the power transmission coil 42 and the foreign-matter detection coil 41 when minimizing the distance between the foreign-matter detection coil 41 and the cover 43. Minimizing the distance between the foreign-matter detection coil 41 and the cover 43 without changing the gap between the power transmission coil 42 and the foreign-matter detection coil 41 can improve the accuracy of the foreign matter detection.

The foreign-matter detecting state in the present embodiment refers to a state in which pairing between the power transmission coil 42 and the power reception coil 22 is completed to detect foreign matter immediately before charging. The foreign-matter detecting state, however, is not limited to this case. The foreign-matter detecting state may be a state in which positioning between the power transmission coil 42 and the power reception coil 22 is completed to detect foreign matter. The height of the cover 43 from the ground in the standby state illustrated in FIG. 3A is the same as the height of the cover 43 from the ground in the foreign-matter detecting state illustrated in FIG. 3B. In other words, the elevating mechanism 17 moves the coil-fixed part 46 up but does not cause the cover 43 to come up in the foreign-matter detecting state illustrated in FIG. 3B.

Figure 3B:
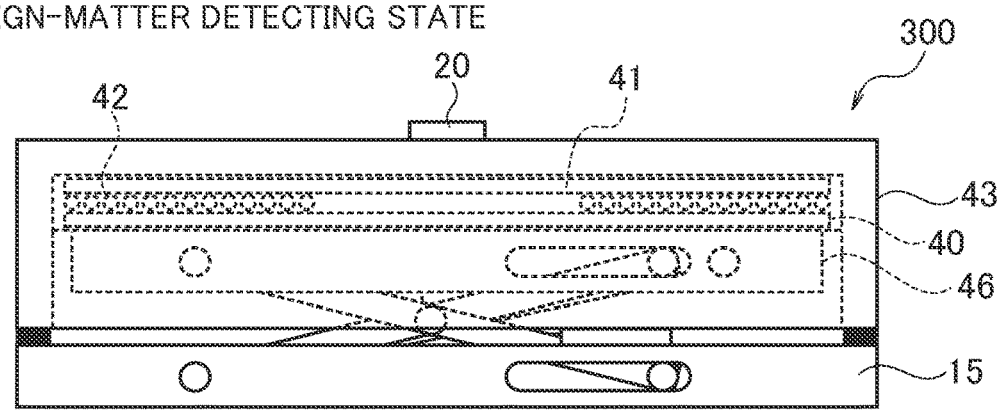
FIG. 3B is a diagram for explaining a foreign-matter detecting state according to the embodiment of the present invention.
Figure 3C:
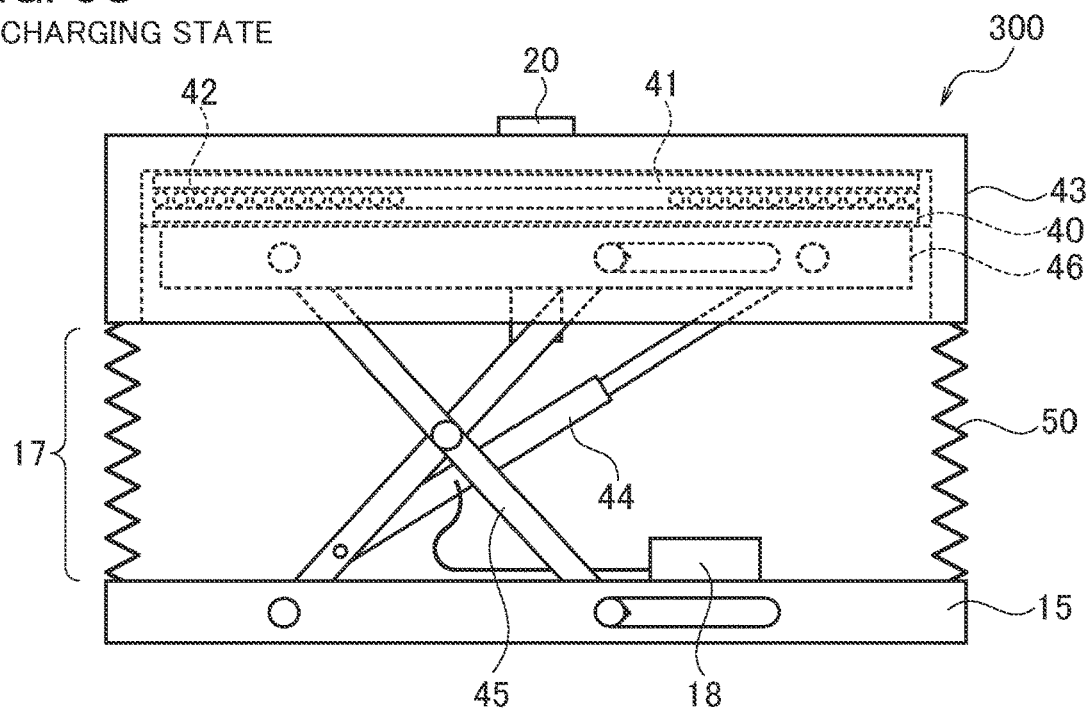
FIG. 3C is a diagram for explaining a charging state according to the embodiment of the present invention.

In a charging state illustrated in FIG. 3C, the elevating mechanism 17 moves up the coil-fixed part 46 further than the foreign-matter detecting state illustrated in FIG. 3B. The cover 43 thus comes up while being in contact with the coil-fixed part 46 via the power transmission coil 42 and the foreign-matter detection coil 41. The cover 43 comes up in association with the upward movement of the coil-fixed part 46. The elevating mechanism 17 in the charging state illustrated in FIG. 3C simultaneously moves up the power transmission coil 42 and the cover 43. The upward movement of the power transmission coil 42 decreases the distance between the power transmission coil 42 and the power reception coil 22 to increase the power transmission efficiency. The term "charging state" as used in the present embodiment refers to a charge-available state or a state in which charging has been started.

A method of setting the distance between the power reception coil 42 and the cover 43 in the axial direction is described below with reference to FIG. 4 and FIG. 5. The setting method described with reference to FIG. 4 and FIG. 5 is an example, and may be determined as appropriate.

Figure 4:
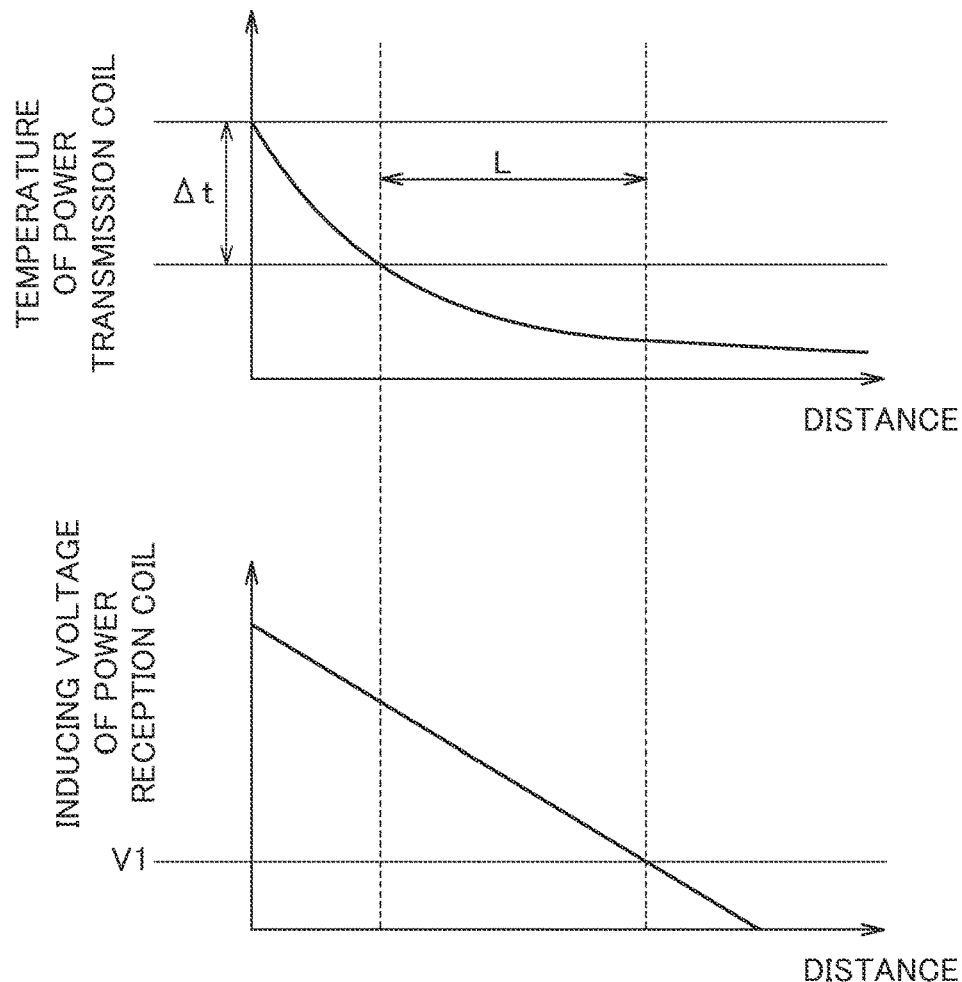
FIG. 4 is a graph showing a relationship between a distance between a power transmission coil and a cover and a temperature of the power transmission coil, and also showing a relationship between the distance between the power transmission coil and the cover and an inducing voltage of a power reception coil.

As shown in FIG. 4, the amount of heat of the cover 43 transmitted toward the power transmission coil 42 decreases to lead the temperature of the power transmission coil 42 to be lower, as the distance between the power transmission coil 42 and the cover 43 in the axial direction is longer in a case of a predetermined irradiation amount of sunlight.

As shown in FIG. 4, a voltage received by the power reception coil 22 during positioning between the power transmission coil 42 and the power reception coil 22 decreases as the distance between the power transmission coil 42 and the cover 43 in the axial direction is longer. The voltage received by the power reception coil 22 for positioning is only required to be V1 or greater.

Figure 5:
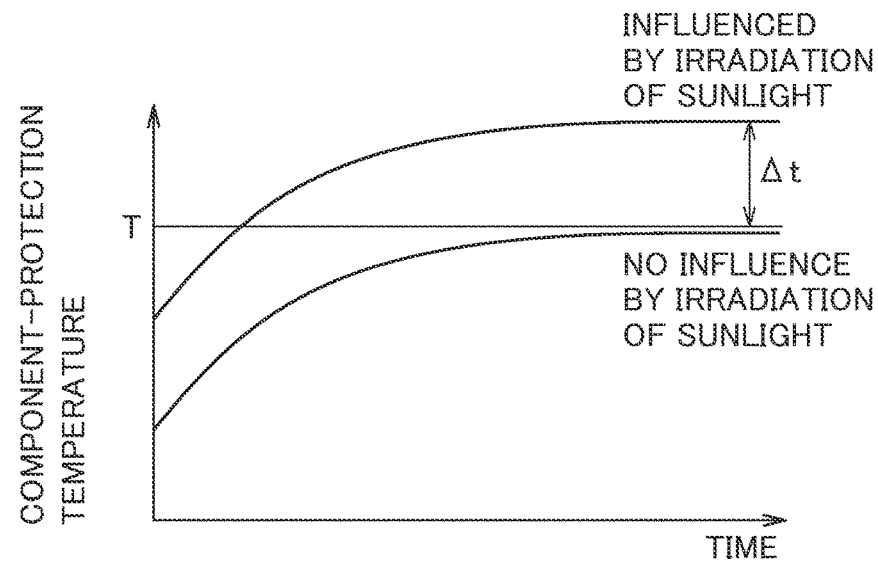
FIG. 5 is a graph showing a relationship between a time and a component-protection temperature.

As shown in FIG. 5, when the power transmission coil 42 is influenced by the irradiation with sunlight, namely, when the heat of the cover 43 is transmitted to the power transmission coil 42, the temperature of the power transmission coil 42 during charging may exceed a temperature T necessary for protecting the components. In view of this, as shown in FIG. 5, a temperature difference $\Delta T$ is set such that the temperature of the power transmission coil 42 does not exceed the temperature T in a state in which the power transmission coil 42 is not influenced by the irradiation with sunlight. The temperature of the power transmission coil 42 does not exceed the temperature T during charging when the temperature of the power transmission coil 42 is lower than or equal to the lower limit of the temperature difference $\Delta T$ in the standby state (refer to FIG. 3A). The distance between the power transmission coil 42 and the cover 43 in the axial direction is thus set within the distance L.

Next, an example of operation of the wireless power supply system is described below with reference to the flowcharts shown in FIG. 6 and FIG. 7.

In step S101, the charge control unit 24 determines whether the user executes a charge start operation. The charge start operation as used herein refers to an operation in which the user operates a charge start switch provided in the compartment of the vehicle 10, for example. When the user executes the charge start operation (Yes in step S101), the process proceeds to step S103, and the user starts parking. When the user does not execute the charge start operation yet (No in step S101), the process is on standby.

The process proceeds to step S105, and the charge control unit 24 starts the Wi-Fi communication with the control unit 14 via the wireless communication unit 23. The charge control unit 24 sends a weak-excitation requirement signal to the control unit 14 when the vehicle 10 is coming close to the parking space. The communication means is not limited to the Wi-Fi communication, and may be any other means.

The process proceeds to step S107, and the control unit 14 detects the position of the power reception coil 22. The control unit 14 supplies the electric power of weak excitation to the power transmission coil 42 so as to subject the power transmission coil 42 to weak excitation in accordance with the weak-excitation requirement signal received in step S105. The charge control unit 24 detects the electric power received by the power reception coil 22, and determines that the power reception coil 22 is present within the charge available region when the received electric power is a predetermined threshold or greater.

When the power reception coil 22 is present within the charge available region (Yes in step S109), the process proceeds to step S111, and the control unit 14 executes pairing between the power transmission coil 42 and the power reception coil 22. The term "pairing" as used herein refers to processing of confirming the combination between the power reception coil 22 and the power transmission coil 42 which supplies the electric power via a wireless connection to the power reception coil 22. When the power reception coil 22 is not present within the charge available region (No in step S109), the process returns to step S103. When the control unit 14 succeeds in the pairing between the power transmission coil 42 and the power reception coil 22 (Yes in step S111), the process proceeds to step S114, and the elevating mechanism 17 moves the coil-fixed part 46 up. The standby state is thus shifted to the foreign-matter detecting state. The processing in step S101 to step S113 is executed in the standby state, and the air layer 60 is provided between the power transmission coil 42 and the cover 43 in the axial direction. When the pairing is not available (No in step S111), the process proceeds to step S113, and the user retries parking.

The process proceeds to step S115, and the control unit 14 drives the foreign-matter detection coil 41. The foreign-matter detection coil 41 detects the presence or absence of foreign matter on the top surface of the cover 43. When any foreign matter is present on the top surface of the cover 43 (Yes in step S116), the process proceeds to step S117, and the notification unit 30 notifies the user of the presence of the foreign matter on the top surface of the cover 43. When the user removes the foreign matter in step S118, the process returns to step S116.

When no foreign matter is present on the top surface of the cover 43 (No in step S116), the process proceeds to step 119, and the notification unit 30 notifies the user that the charge is available. When the user turns off the ignition (Yes in step S121), the process proceeds to step S123. When the user does not turn off the ignition yet (No in step S121), the process is on standby. The phrase "turning off the ignition" as used in the present embodiment encompasses the operation of stopping the vehicle 10 and the operation of stopping the power supply system of the vehicle 10. The ignition may be turned off such that an ignition switch provided in the compartment of the vehicle 10 is turned off, or such that a power supply system switch provided in the compartment of the vehicle is turned off.

In step S123, the elevating mechanism 17 further moves the coil-fixed part 46 up, and adjusts the position between the power transmission coil 42 and the power reception coil 22 (in step S125). The foreign-matter detecting state is thus shifted to the charging state. In step S127, the foreign-matter detection coil 41 again detects the presence or absence of foreign matter on the top surface of the cover 43. When any foreign matter is present on the top surface of the cover 43 (Yes in step S127), the process proceeds to step S129, and the notification unit 30 notifies the user of the presence of the foreign matter on the top surface of the cover 43. The process proceeds to step S131, and the elevating mechanism 17 moves the coil-fixed part 46 down. When the user removes the foreign matter in step S133, the process returns to step S123.

When no foreign matter is present on the top surface of the cover 43 (No in step S127), the control unit 14 starts charging. The process proceeds to step S137, and the foreign-matter detection coil 41 detects the presence or absence of foreign matter on the top surface of the cover 43 during charging. When any foreign matter is present on the top surface of the cover 43 (Yes in step S137), the process proceeds to step S145, and the control unit 14 stops charging. When no foreign matter is present on the top surface of the cover 43 (No in step S137), the process proceeds to step S139, and the charge is completed. The process proceeds to step S141, and the elevating mechanism 17 moves the coil-fixed part 46 down. The process proceeds to step S143, and the notification unit 30 notifies the user of the completion of the charge.

As described above, the wireless power supply system according to the present embodiment can achieve the following operational effects.

The foreign-matter detection coil 41 before detecting foreign matter is separated from the cover 43 with a predetermined distance in the axial direction. Namely, the air layer 60 is provided between the foreign-matter detection coil 41 and the cover 43 before the foreign-matter detection coil 41 starts detecting foreign matter. The air layer 60 can reduce the transmission of heat of the cover 43 toward the power transmission coil 42 if the temperature of the cover 43 increases due to the irradiation with sunlight. The probability that the charge stops is thus decreased.

The elevating mechanism 17 moves up the coil-fixed part 46 so as to lead the distance between the foreign-matter detection coil 41 and the cover 43 to be shorter than the predetermined distance when the foreign-matter detection coil 41 detects foreign matter. The upward movement decreases the distance between the foreign-matter detection coil 41 and the cover 43, so as to improve the accuracy of the foreign matter detection. The elevating mechanism 17 moves up the power transmission coil 42 and the foreign-matter detection coil 41 together while keeping the gap between the power transmission coil 42 and the foreign-matter detection coil 41. No change in the gap between the power transmission coil 42 and the foreign-matter detection coil 41 can further improve the accuracy of the foreign matter detection.

Modified Example 1

Figure 8A:
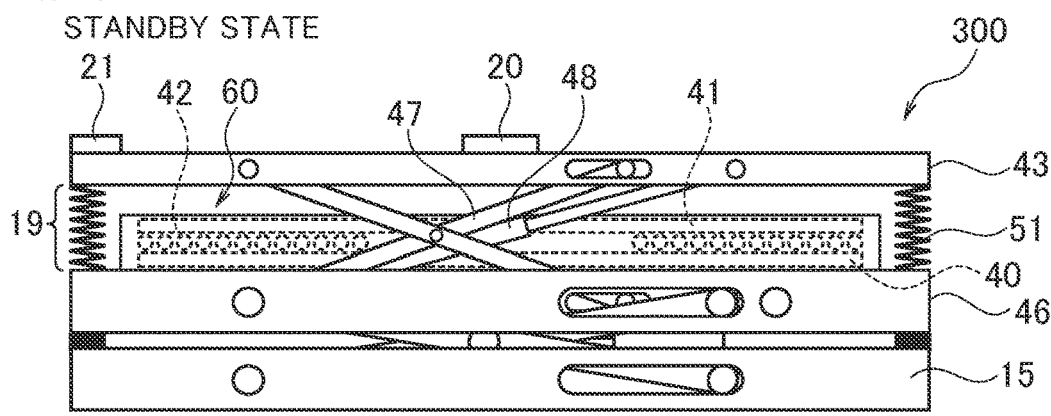
FIG. 8A is a diagram for explaining a standby state according to modified example 1 of the present invention.

FIG. 3A to FIG. 3C are illustrated above with the case in which the single elevating mechanism 17 moves the power transmission coil 42 up and down, but the number of the elevating mechanism is not limited to one. For example, as illustrated in FIG. 8A, the power transmission device 300 may further include an elevating mechanism 19, in addition to the elevating mechanism 17. The elevating mechanism 19 includes two arms 47, an actuator 48, and bellows 51, as illustrated in FIG. 8A. The arms 47, the actuator 48, and the bellows 51 are the same as the arms 45, the actuator 44, and the bellows 50 included in the elevating mechanism 17, and explanations are not repeated below.

In the standby state illustrated in FIG. 8A, the elevating mechanism 17 moves down the coil-fixed part 46 so as to minimize the distance between the coil-fixed part 46 and the ground-fixed part 15. In the standby state illustrated in FIG. 8A, the elevating mechanism 19 moves up the cover 43 so as to provide the air layer 60 between the power transmission coil 42 and the cover 43 in the axial direction. The air layer 60 can reduce the transmission of heat of the cover 43 toward the power transmission coil 42 if the temperature of the cover 43 increases due to the irradiation with sunlight.

Figure 8B:
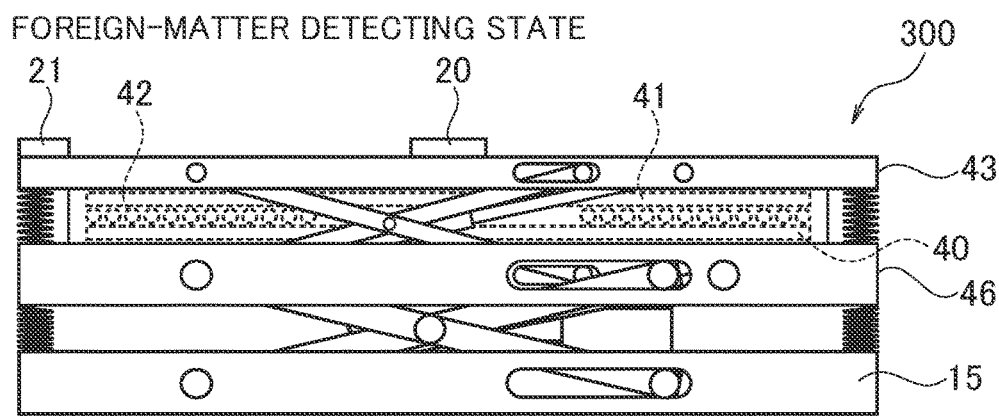
FIG. 8B is a diagram for explaining a foreign-matter detecting state according to modified example 1 of the present invention.

In the foreign-matter detecting state illustrated in FIG. 8B, the elevating mechanism 17 moves up the coil-fixed part 46 while keeping the height of the cover 43 from the ground so as to be the same as the height in the standby state illustrated in FIG. 8A. The distance between the coil-fixed part 46 and the cover 43 is thus minimized with no change in the height of the cover 43. The distance between the foreign-matter detection coil 41 and the cover 43 is also minimized, so as to improve the accuracy of the foreign matter detection.

Figure 8C:
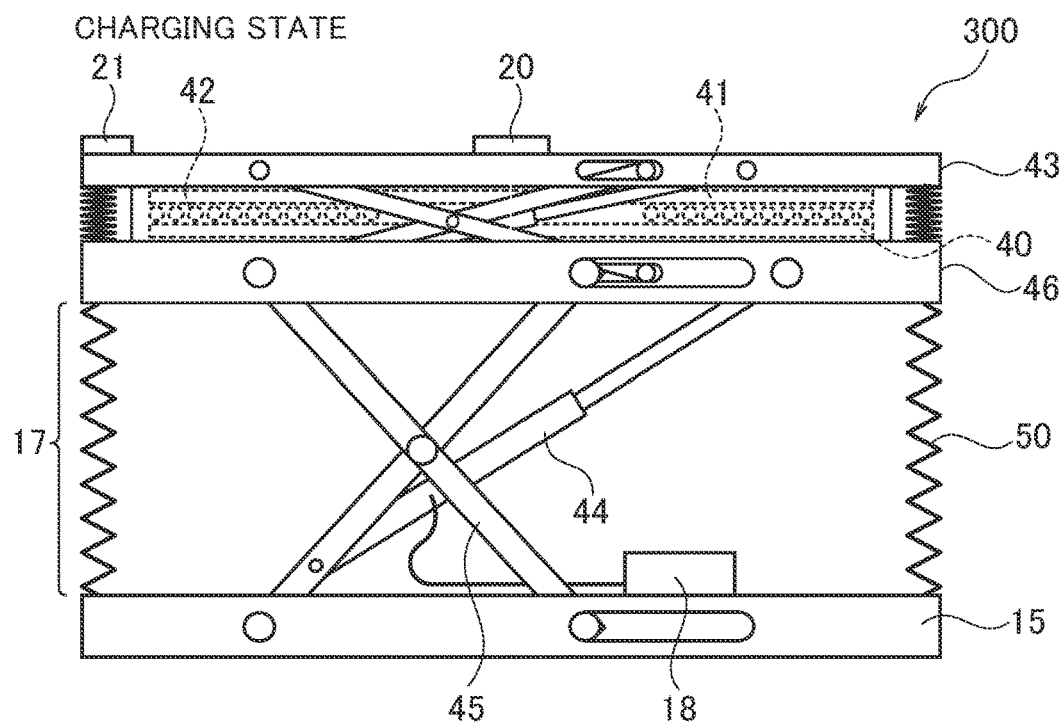
FIG. 8C is a diagram for explaining a charging state according to modified example 1 of the present invention.

In the charging state illustrated in FIG. 8C, the elevating mechanism 17 moves up the coil-fixed part 46 further than the foreign-matter detecting state illustrated in FIG. 8B. The distance between the power transmission coil 42 and the power reception coil 22 is thus decreased, so as to increase the power transmission efficiency.

The foreign-matter detecting state may be changed to the standby state depending on the irradiation amount of sunlight received by the cover 43. The irradiation amount of sunlight received by the cover 43 varies depending on the date and time and the weather, for example. The temperature of the cover 43 does not increase when the irradiation amount of sunlight received by the cover 43 is small. The influence of the heat of the cover 43 exerted on the power transmission coil 42 is thus small. The thickness of the air layer 60 can be reduced when the irradiation amount of sunlight received by the cover 43 is small, as compared with the case when the irradiation amount of sunlight received by the cover 43 is large. When the irradiation amount of sunlight received by the cover 43 is substantially zero, the air layer 60 does not need to be provided. The foreign-matter detecting state illustrated in FIG. 8B thus can be changed to the standby state when the irradiation amount of sunlight received by the cover 43 is small. In other words, the foreign-matter detecting state illustrated in FIG. 8B may be replaced with the standby state. This saves the time to shift from the standby state to the foreign-matter detecting state, so as to reduce the time required for charging.

The irradiation amount of sunlight received by the cover 43 may be acquired by a sunlight irradiation amount sensor 21 shown in FIG. 8A. The elevating mechanism 17 increases the distance in the axial direction between the power transmission coil 42 and the cover 43 as the irradiation amount of sunlight increases. The elevating mechanism 17 may increase the distance in the axial direction between the power transmission coil 42 and the cover 43 gradually or linearly, depending on the irradiation amount of sunlight. In particular, the elevating mechanism 17 can move down the power transmission coil 42 so as to increase the distance in the axial direction between the power transmission coil 42 and the cover 43 when the irradiation amount of sunlight acquired by the sunlight irradiation amount sensor 21 is large, as compared with the case in which the irradiation amount of sunlight is small. This can reduce the transmission of heat of the cover 43 toward the power transmission coil 42 if the temperature of the cover 43 increases due to the irradiation with sunlight. The means of determining the influence of the irradiation with sunlight is not limited to the sunlight irradiation amount sensor 21. The influence of the irradiation with sunlight may be determined in accordance with the temperature acquired by a temperature sensor. Alternatively, the influence of the irradiation with sunlight may be determined in accordance with various kinds of information such as the seasons or the location in which the power transmission device 300 is installed. The case illustrated in FIG. 3A to FIG. 3C may also be provided with the sunlight irradiation amount sensor 21.

Modified Example 2

Figure 9A:
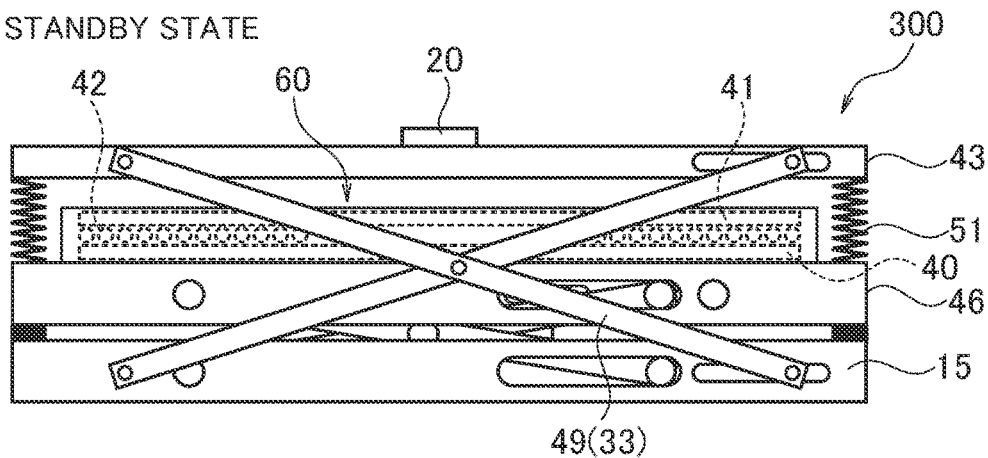
FIG. 9A is a diagram for explaining a standby state according to modified example 2 of the present invention.

As illustrated in FIG. 9A, the power transmission device 300 may further include an elevating mechanism 33, in addition to the elevating mechanism 17. The elevating mechanism 33 includes two arms 49. In the standby state illustrated in FIG. 9A, the elevating mechanism 17 moves down the coil-fixed part 46 so as to minimize the distance between the coil-fixed part 46 and the ground-fixed part 15. In the standby state illustrated in FIG. 9A, the elevating mechanism 33 moves up the cover 43 so as to provide the air layer 60 between the power transmission coil 42 and the cover 43 in the axial direction. The air layer 60 can reduce the transmission of heat of the cover 43 toward the power transmission coil 42 if the temperature of the cover 43 increases due to the irradiation with sunlight.

Figure 9B:
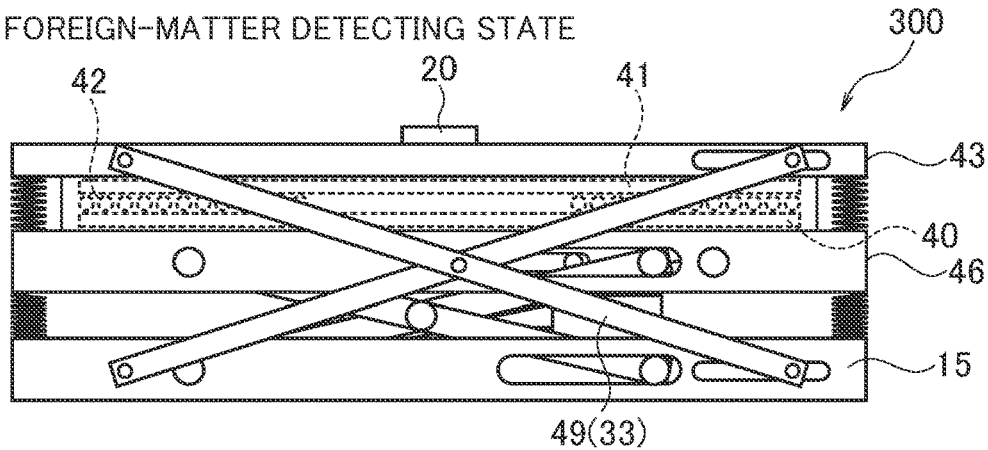
FIG. 9B is a diagram for explaining a foreign-matter detecting state according to modified example 2 of the present invention.

In the foreign-matter detecting state illustrated in FIG. 9B, the elevating mechanism 17 moves up the coil-fixed part 46 while keeping the height of the cover 43 from the ground so as to be the same as the height in the standby state illustrated in FIG. 9A. The distance between the coil-fixed part 46 and the cover 43 is thus minimized with no change in the height of the cover 43. The distance between the foreign-matter detection coil 41 and the cover 43 is also minimized, so as to improve the accuracy of the foreign matter detection.

Figure 9C:
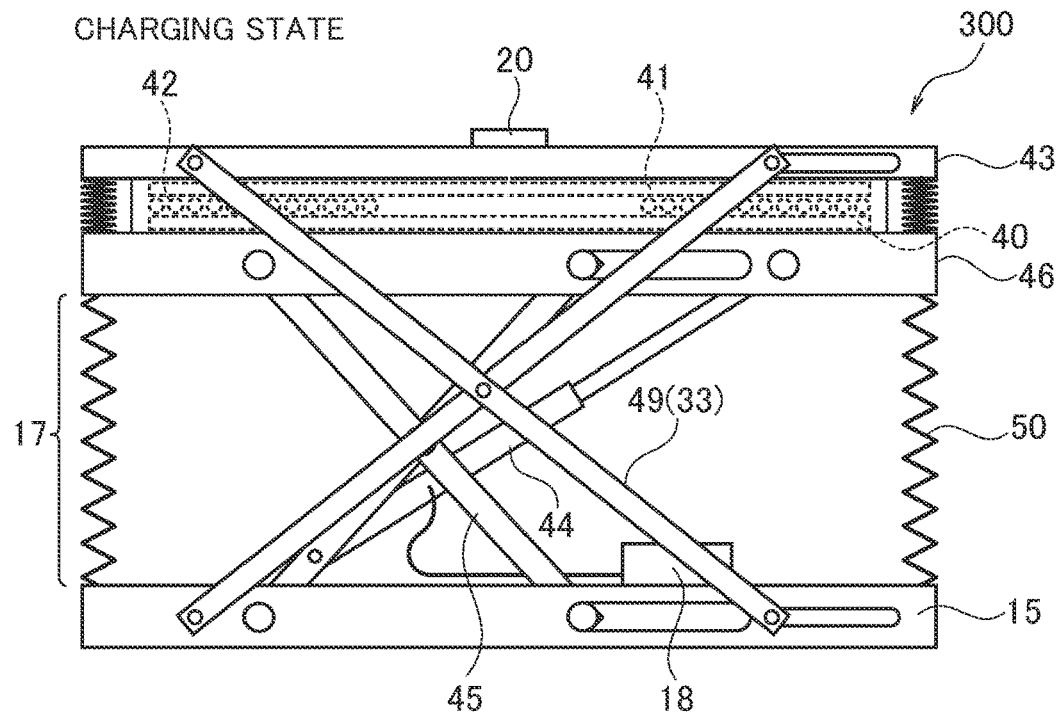
FIG. 9C is a diagram for explaining a charging state according to modified example 2 of the present invention.

In the charging state illustrated in FIG. 9C, the elevating mechanism 17 moves up the coil-fixed part 46 further than the foreign-matter detecting state illustrated in FIG. 9B. The distance between the power transmission coil 42 and the power reception coil 22 is thus decreased, so as to increase the power transmission efficiency.

Modified Example 3

Figure 10A:
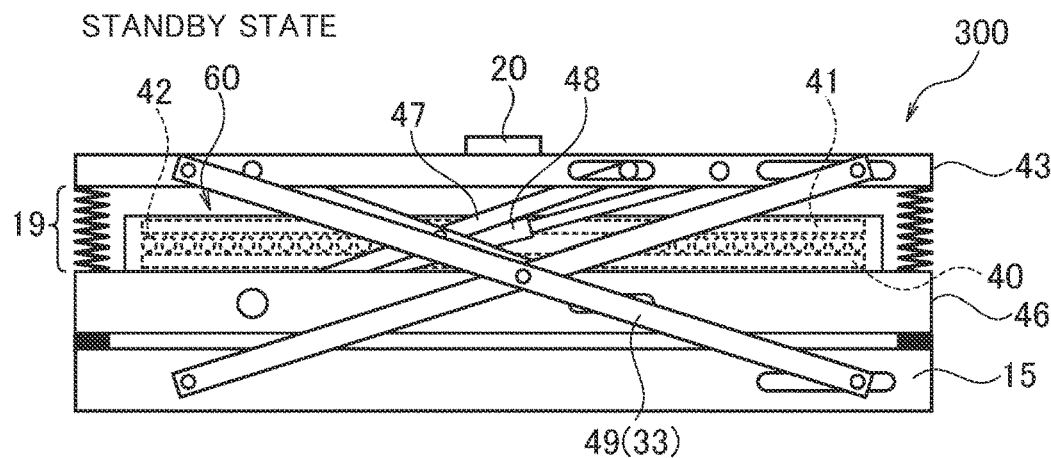
FIG. 10A is a diagram for explaining a charging state according to modified example 3 of the present invention.

As illustrated in FIG. 10A, the power transmission device 300 may include the elevating mechanism 19 and the elevating mechanism 33, instead of the elevating mechanism 17. In the standby state illustrated in FIG. 10A, the elevating mechanism 19 moves down the coil-fixed part 46 so as to minimize the distance between the coil-fixed part 46 and the ground-fixed part 15. In the standby state illustrated in FIG. 10A, the elevating mechanism 33 moves up the cover 43 so as to provide the air layer 60 between the power transmission coil 42 and the cover 43 in the axial direction. The air layer 60 can reduce the transmission of heat of the cover 43 toward the power transmission coil 42 if the temperature of the cover 43 increases due to the irradiation with sunlight.

Figure 10B:
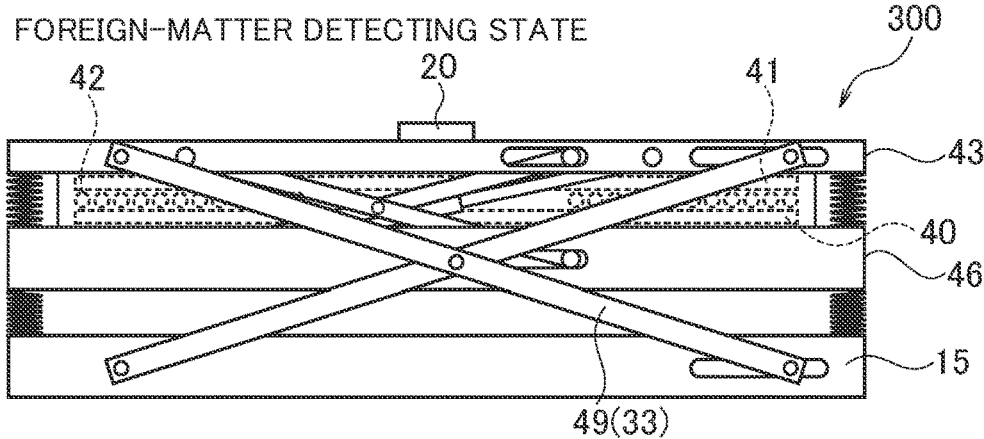
FIG. 10B is a diagram for explaining a foreign-matter detecting state according to modified example 3 of the present invention.

In the foreign-matter detecting state illustrated in FIG. 10B, the elevating mechanism 19 moves up the coil-fixed part 46 while keeping the height of the cover 43 from the ground so as to be the same as the height in the standby state illustrated in FIG. 10A. The distance between the coil-fixed part 46 and the cover 43 is thus minimized with no change in the height of the cover 43. The distance between the foreign-matter detection coil 41 and the cover 43 is also minimized, so as to improve the accuracy of the foreign matter detection.

Figure 10C:
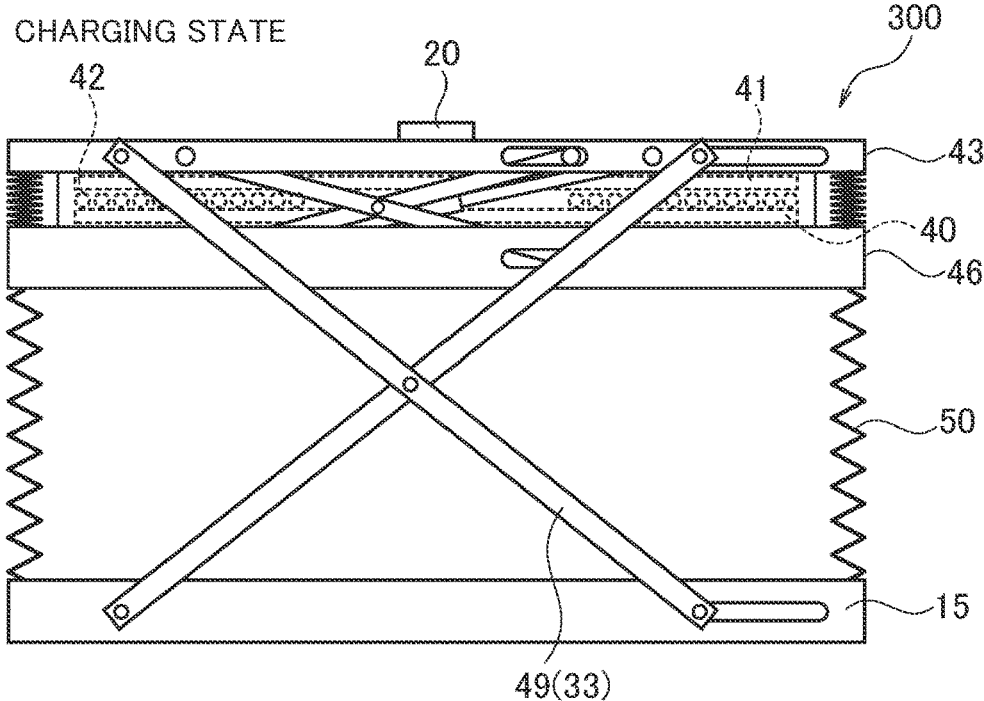
FIG. 10C is a diagram for explaining a charging state according to modified example 3 of the present invention.

In the charging state illustrated in FIG. 10C, the elevating mechanism 33 moves up the cover 43 further than the foreign-matter detecting state illustrated in FIG. 10B. The elevating mechanism 19 operates to minimize the distance between the coil-fixed part 46 and the cover 43. The distance between the power transmission coil 42 and the power reception coil 22 is thus decreased, so as to increase the power transmission efficiency.

Modified Example 4

The embodiment is illustrated above with the case in which the height of the cover 43 in the charging state is greater than the height of the cover 43 in the foreign-matter detecting state and in the standby state, but is not limited to this case. The height of the cover 43 may be the same in all of the charging state, the foreign-matter detecting state, and the standby state. This case is described below with reference to FIG. 11A and FIG. 11B.

Figure 11A:
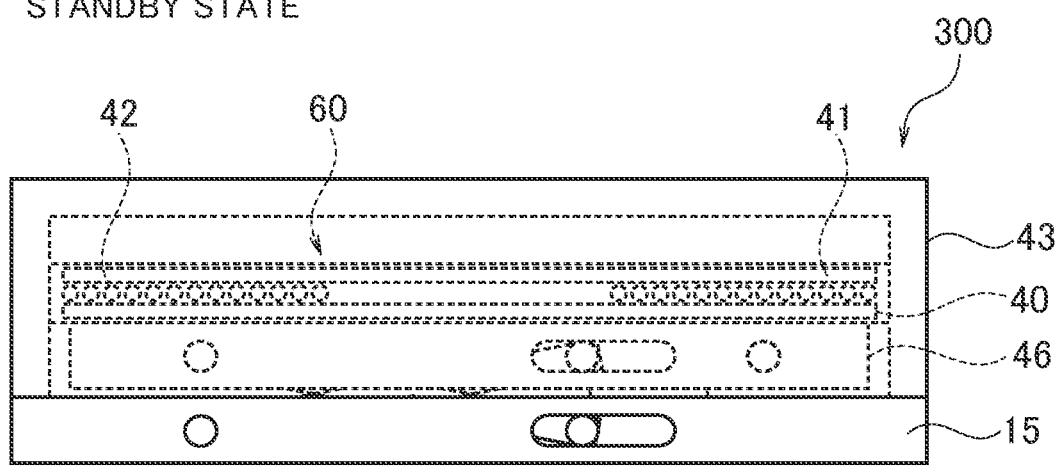
FIG. 11A is a diagram for explaining a standby state according to modified example 4 of the present invention.

In the standby state illustrated in FIG. 11A, the elevating mechanism 17 moves down the coil-fixed part 46 so as to provide the air layer 60. The air layer 60 can reduce the transmission of heat of the cover 43 toward the power transmission coil 42 if the temperature of the cover 43 increases due to the irradiation with sunlight. In the foreign-matter detecting state and the charging state illustrated in FIG. 11B, the elevating mechanism 17 moves up the coil-fixed part 46 while keeping the height of the cover 43 from the ground so as to be the same as the height in the standby state illustrated in FIG. 11A. The distance between the coil-fixed part 46 and the cover 43 is thus minimized with no change in the height of the cover 43. The distance between the foreign-matter detection coil 41 and the cover 43 is also minimized, so as to improve the accuracy of the foreign matter detection. In addition, the distance between the power transmission coil 42 and the power reception coil 22 is also decreased, so as to increase the power transmission efficiency.

Figure 11B:
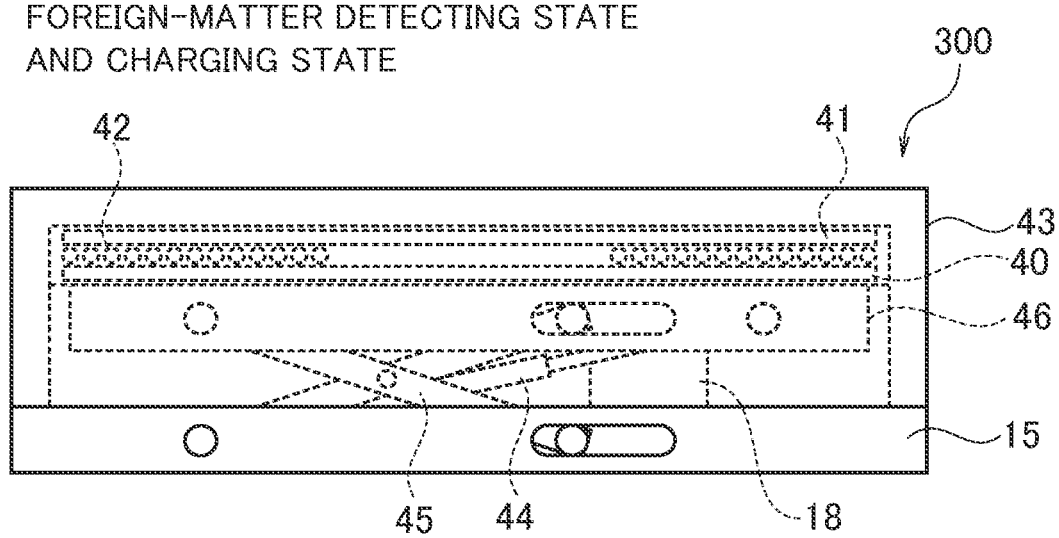
FIG. 11B is a diagram for explaining a foreign-matter detecting state and a charging state according to modified example 4 of the present invention.
Figure 12:
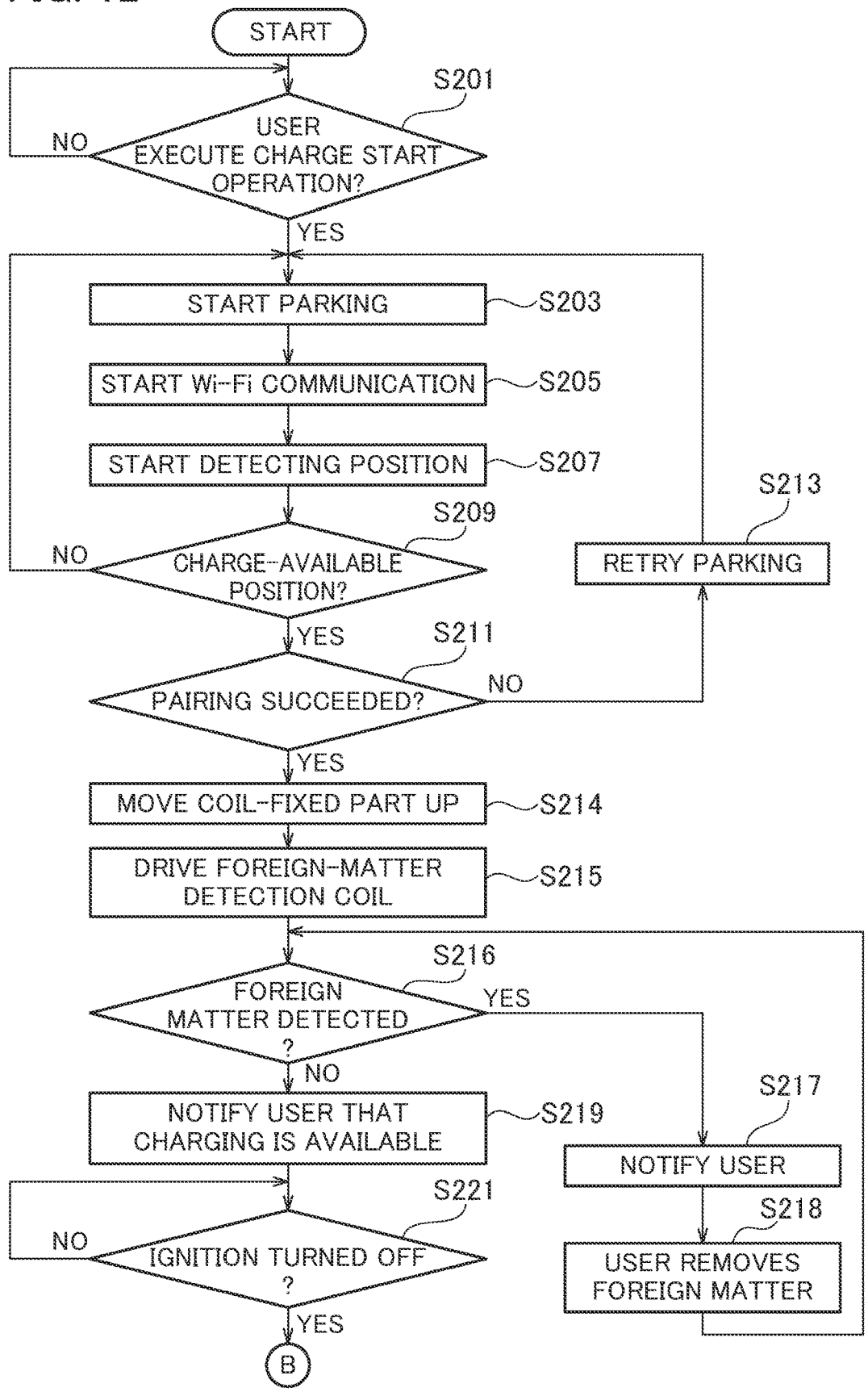
FIG. 12 is a flowchart for explaining an example of operation of the wireless power supply system according to modified example 4 of the present invention.
Figure 13:
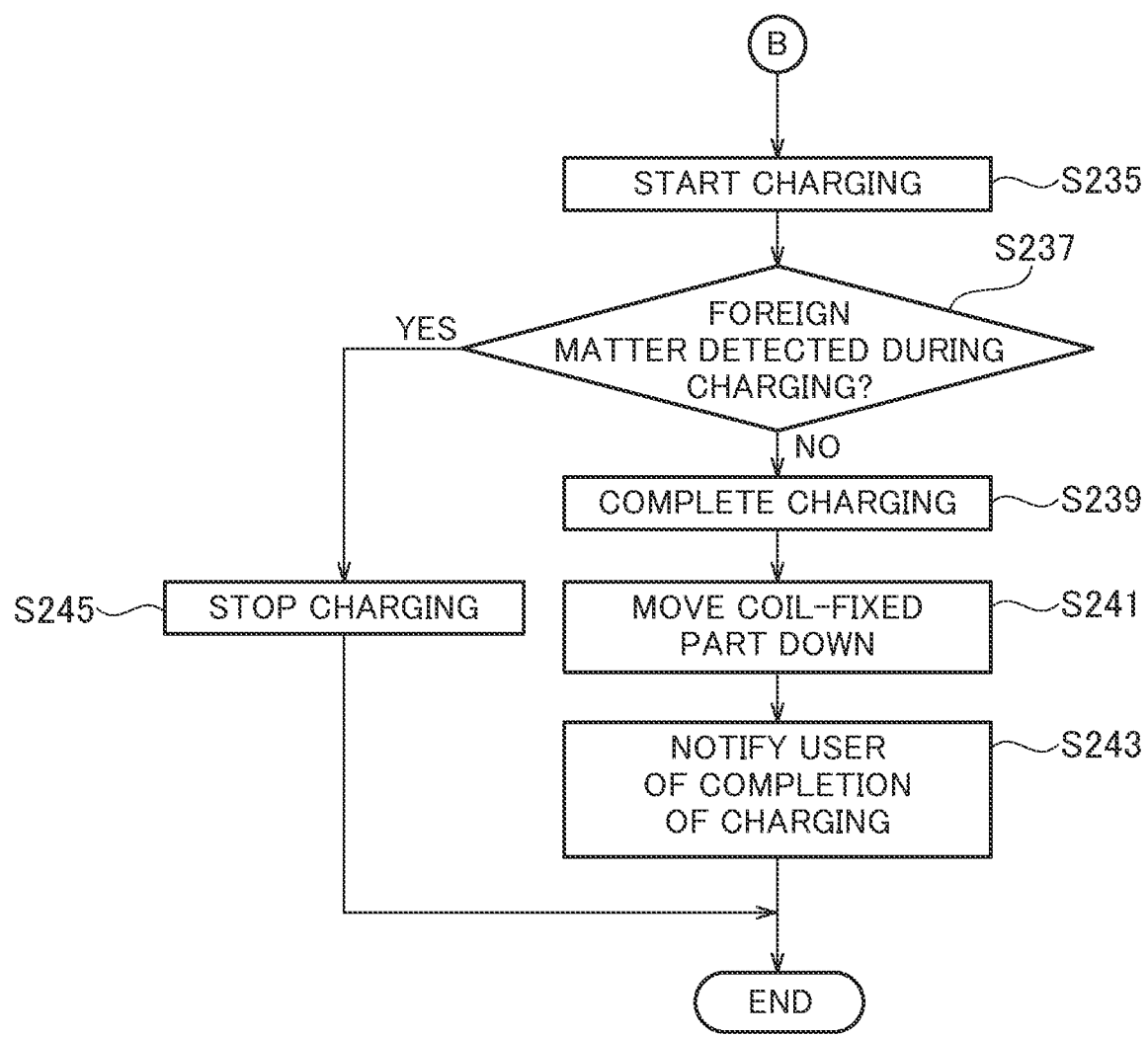
FIG. 13 is a flowchart for explaining the example of operation of the wireless power supply system according to modified example 4 of the present invention.

An example of operation of the wireless power supply system according to modified example 4 is described below with reference to the flowcharts shown in FIG. 12 and FIG. 13. The processing in step S201 to step S221 shown in FIG. 12 is the same as the processing in step S101 to step S121 shown in FIG. 6. The processing in step S235 to step S245 shown in FIG. 13 is the same as the processing in step S135 to step S145 shown in FIG. 7. When the height of the cover 43 is the same in all of the charging state, the foreign-matter detecting state, and the standby state, as illustrated in FIG. 11A and FIG. 11B, the processing in step S123 to step S133 shown in FIG. 7 does not need to be executed, so as to reduce the time required for charging.

Modified Example 5

Figure 14A:
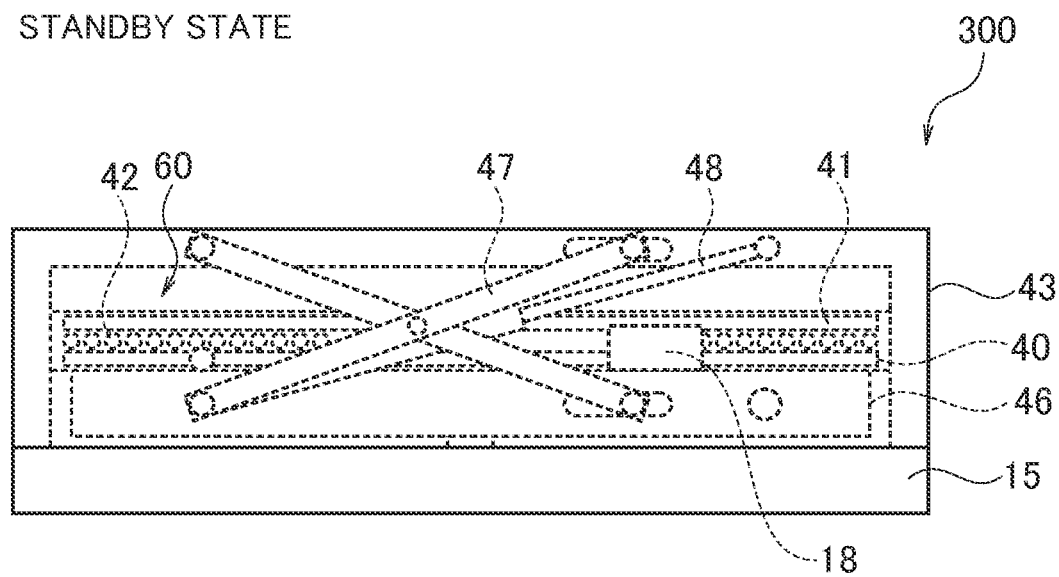
FIG. 14A is a diagram for explaining a standby state according to modified example 5 of the present invention.

As illustrated in FIG. 14A, the power transmission device 300 may use the elevating mechanism 19, instead of the elevating mechanism 17, so as to move the coil-fixed part 46 up and down. In the standby state illustrated in FIG. 14A, the elevating mechanism 19 moves down the coil-fixed part 46 so as to minimize the distance between the coil-fixed part 46 and the ground-fixed part 15. The downward movement provides the air layer 60 between the power transmission coil 42 and the cover 43 in the axial direction. The air layer 60 can reduce the transmission of heat of the cover 43 toward the power transmission coil 42 if the temperature of the cover 43 increases due to the irradiation with sunlight.

Figure 14B:
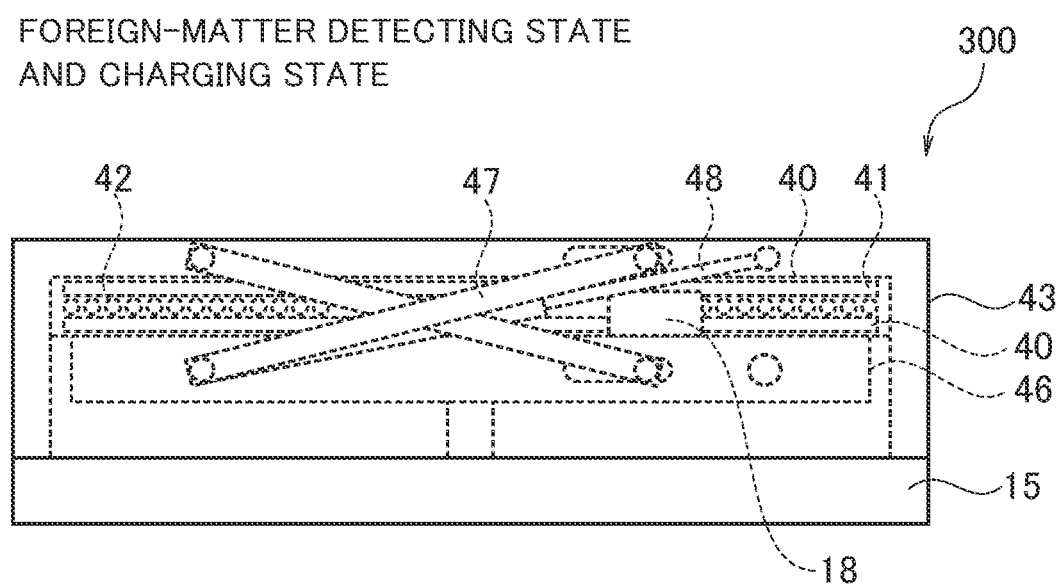
FIG. 14B is a diagram for explaining a foreign-matter detecting state and a charging state according to modified example 5 of the present invention.

In the foreign-matter detecting state and the charging state illustrated in FIG. 14B, the elevating mechanism 19 moves up the coil-fixed part 46 while keeping the height of the cover 43 from the ground so as to be the same as the height in the standby state illustrated in FIG. 14A. The distance between the coil-fixed part 46 and the cover 43 is thus minimized with no change in the height of the cover 43. The distance between the foreign-matter detection coil 41 and the cover 43 is also minimized, so as to improve the accuracy of the foreign matter detection. In addition, the distance between the power transmission coil 42 and the power reception coil 22 is also decreased, so as to increase the power transmission efficiency.

The respective functions described in the above embodiment can be implemented in single or plural processing circuits. The respective processing circuits include a programmed processing device, such as a processing device including an electric circuit. The respective processing circuits also include a device including an application-specific integrated circuit (ASIC) configured to execute the functions described above, and circuit components.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

Figure 6:
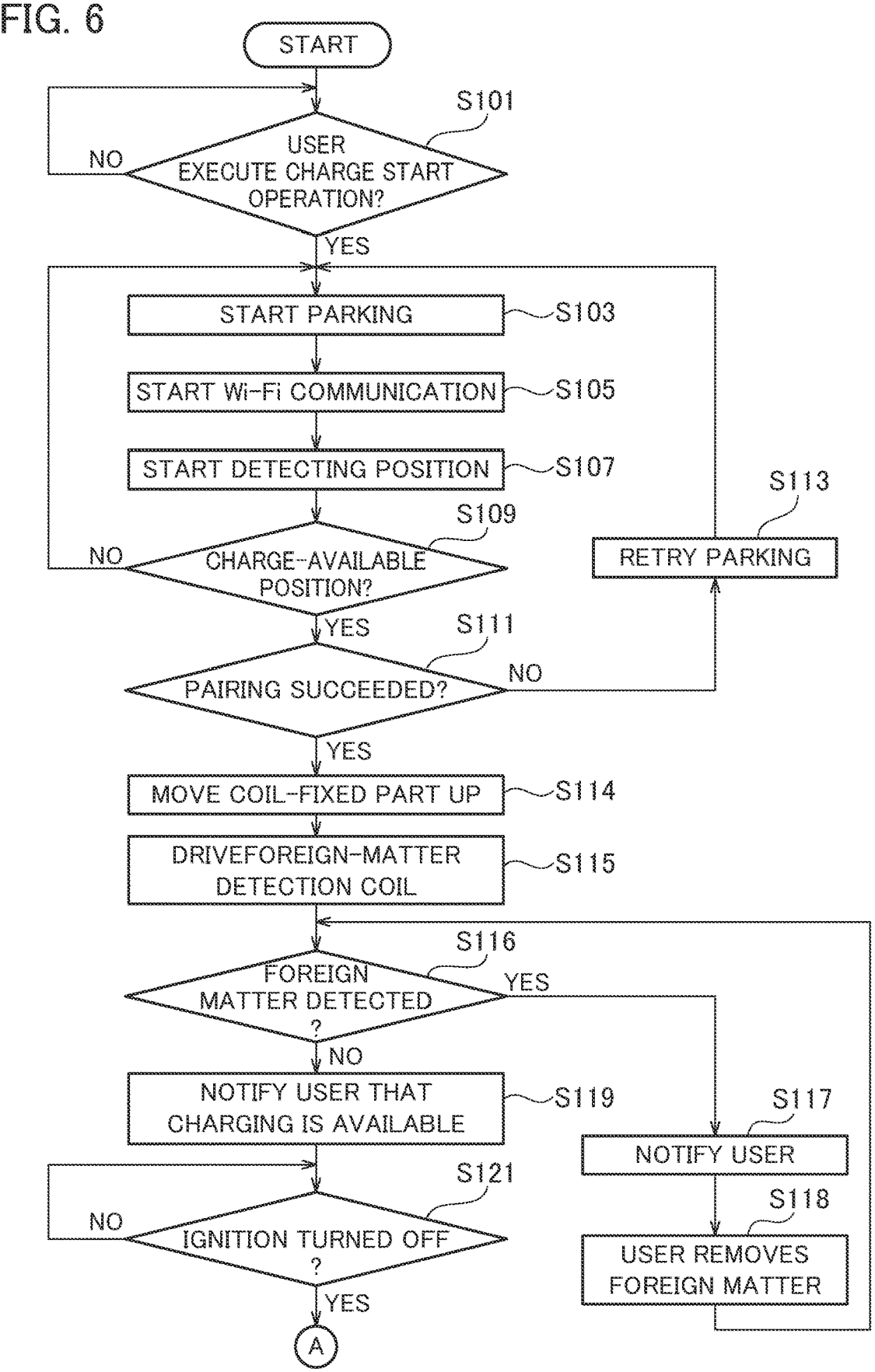
FIG. 6 is a flowchart for explaining an example of operation of the wireless power supply system according to the embodiment of the present invention.
Figure 7:
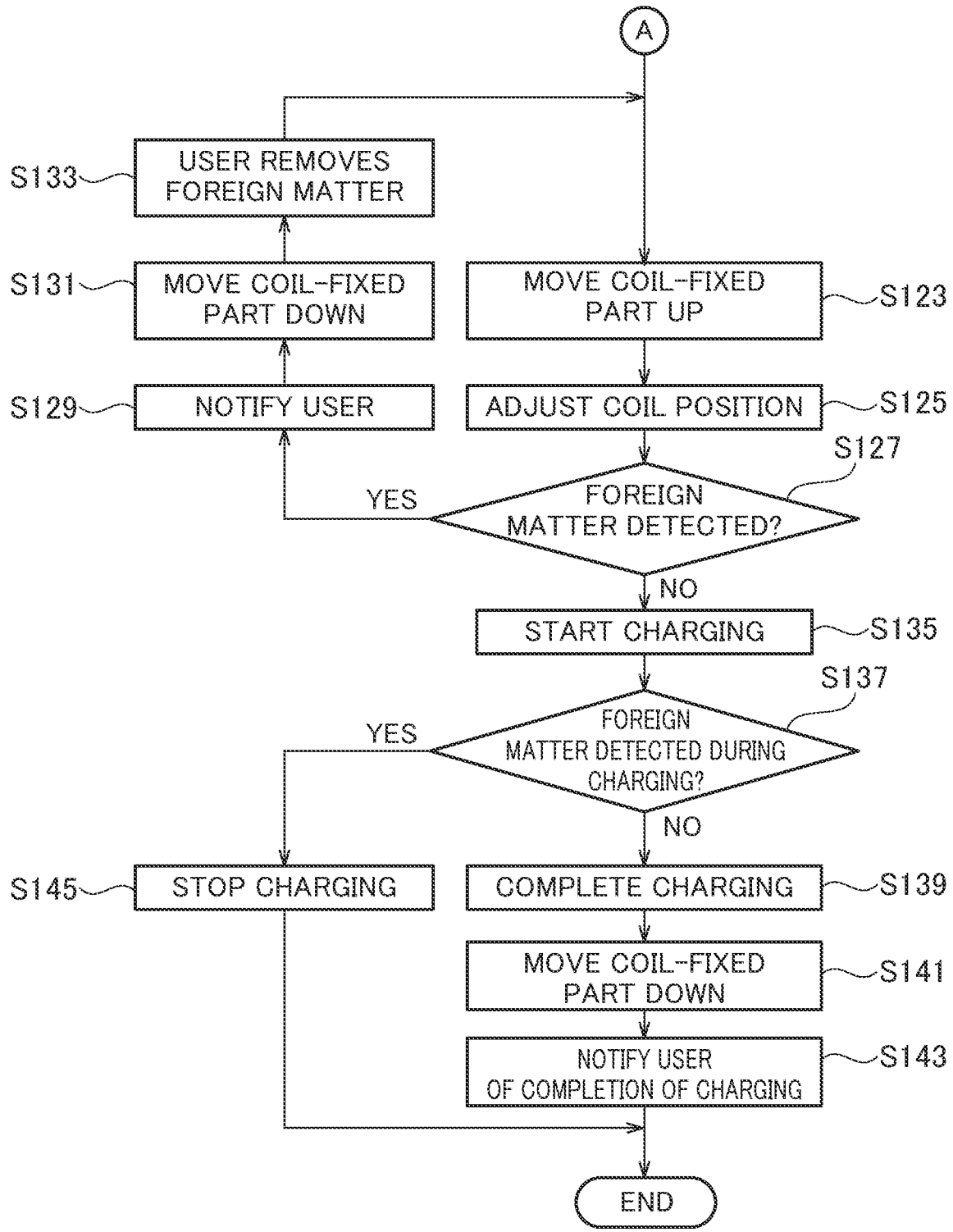
FIG. 7 is a flowchart for explaining the example of operation of the wireless power supply system according to the embodiment of the present invention.
Figure 15:
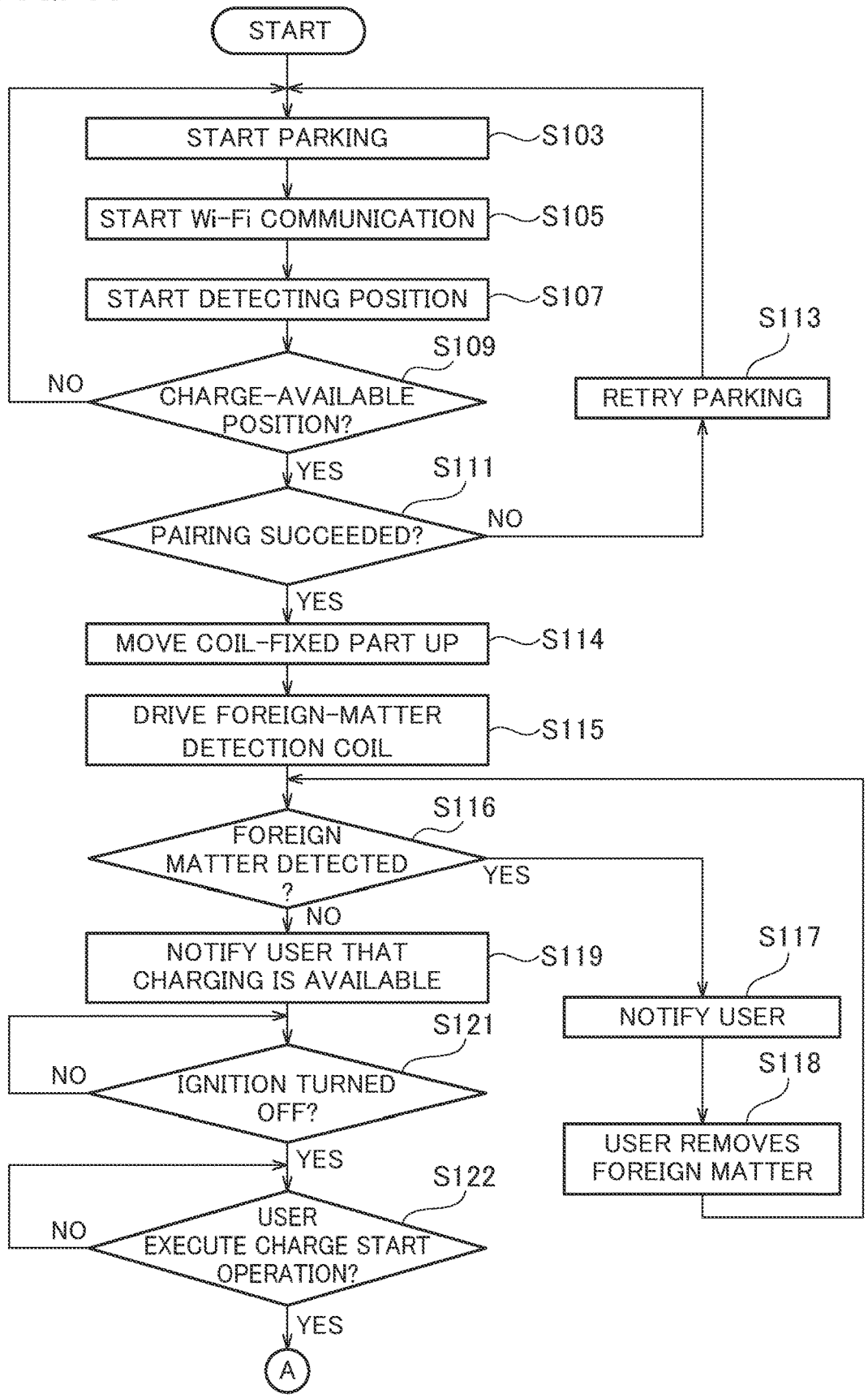
FIG. 15 is a flowchart for explaining an example of operation of the wireless power supply system according to the embodiment of the present invention.

For example, while the flowchart shown in FIG. 6 is illustrated with the case in which the series of control processing starts when the user executes the charge start operation, the embodiment is not limited to this case. As illustrated in FIG. 15, the determination of whether the user executes the charge start operation may be made after the ignition is turned off. While the user sometimes parks in order to charge the vehicle, the user may start charging the vehicle when recognizing that the vehicle needs to be charged after being parked, although the user has no intention of charging the vehicle before parking. The processing shown in FIG. 6 or FIG. 15 can contribute to the user's convenience in various kinds of situations.

REFERENCE SIGNS LIST

14 CONTROL UNIT
15 GROUND-FIXED PART
17, 19, 33 ELEVATING MECHANISM
18 DRIVE CONTROL UNIT
20 DISTANCE SENSOR
21 SUNLIGHT IRRADIATION AMOUNT SENSOR
22 POWER RECEPTION COIL
40 FERRITE CORE
41 FOREIGN-MATTER DETECTION COIL
42 POWER TRANSMISSION COIL
43 COVER
44, 48 ACTUATOR
45, 47, 49 ARM
46 COIL-FIXED PART 50, 51 BELLOWS
60 AIR LAYER
100 POWER SUPPLY DEVICE
200 POWER RECEPTION DEVICE
300 POWER TRANSMISSION DEVICE

The invention claimed is:

1. A power transmission device provided on a ground, the device comprising:
  a power transmission coil configured to supply electric power via a wireless connection to a power reception coil mounted on a vehicle;
  a cover covering at least a top surface of the power transmission coil in an axial direction;
  a foreign-matter detection coil provided between the power transmission coil and the cover; and
  an elevating mechanism configured to move the power transmission coil and the foreign-matter detection coil up and down with respect to the ground while keeping a gap between the power transmission coil and the foreign-matter detection coil,
  wherein the foreign-matter detection coil is separated from the cover with a predetermined distance in the axial direction before detecting foreign matter, and
  the elevating mechanism moves up the foreign-matter detection coil so as to lead a distance between the foreign-matter detection coil and the cover to be shorter than the predetermined distance when the foreign-matter detection coil detects the foreign matter.

2. A method of controlling a power transmission device provided on a ground,
  the power transmission device including:
    a power transmission coil configured to supply electric power via a wireless connection to a power reception coil mounted on a vehicle;
    a cover covering at least a top surface of the power transmission coil in an axial direction;
    a foreign-matter detection coil provided between the power transmission coil and the cover; and
    an elevating mechanism configured to move the power transmission coil and the foreign-matter detection coil up and down with respect to the ground while keeping a gap between the power transmission coil and the foreign-matter detection coil,
  the method comprising:
    causing the foreign-matter detection coil to be separated from the cover with a predetermined distance in the axial direction before detecting foreign matter; and
    moving up the foreign-matter detection coil so as to lead a distance between the foreign-matter detection coil and the cover to be shorter than the predetermined distance when the foreign-matter detection coil detects the foreign matter.

3. A power transmission device provided on a ground, the device comprising:
  a power transmission coil configured to supply electric power via a wireless connection to a power reception coil mounted on a vehicle;
  a cover covering at least a top surface of the power transmission coil in an axial direction;
  an elevating mechanism configured to move the power transmission coil up and down with respect to the ground; and
  a sensor configured to acquire an irradiation amount of sunlight received by the cover,
  wherein the elevating mechanism moves down the power transmission coil so as to increase a distance in the axial direction between the power transmission coil and the cover when the irradiation amount of sunlight acquired by the sensor is large, as compared with a case in which the irradiation amount of sunlight is small.

4. A method of controlling a power transmission device provided on a ground,
  the power transmission device including:
    a power transmission coil configured to supply electric power via a wireless connection to a power reception coil mounted on a vehicle;
    a cover covering at least a top surface of the power transmission coil in an axial direction; and
    an elevating mechanism configured to move the power transmission coil up and down with respect to the ground,
  the method comprising moving down the power transmission coil so as to increase a distance in the axial direction between the power transmission coil and the cover when an irradiation amount of sunlight received by the cover is large, as compared with a case in which the irradiation amount of sunlight is small.

* * * * *